June 14, 1949.  M. YANKO  2,473,321
PLUG-IN CLIP
Filed July 27, 1945
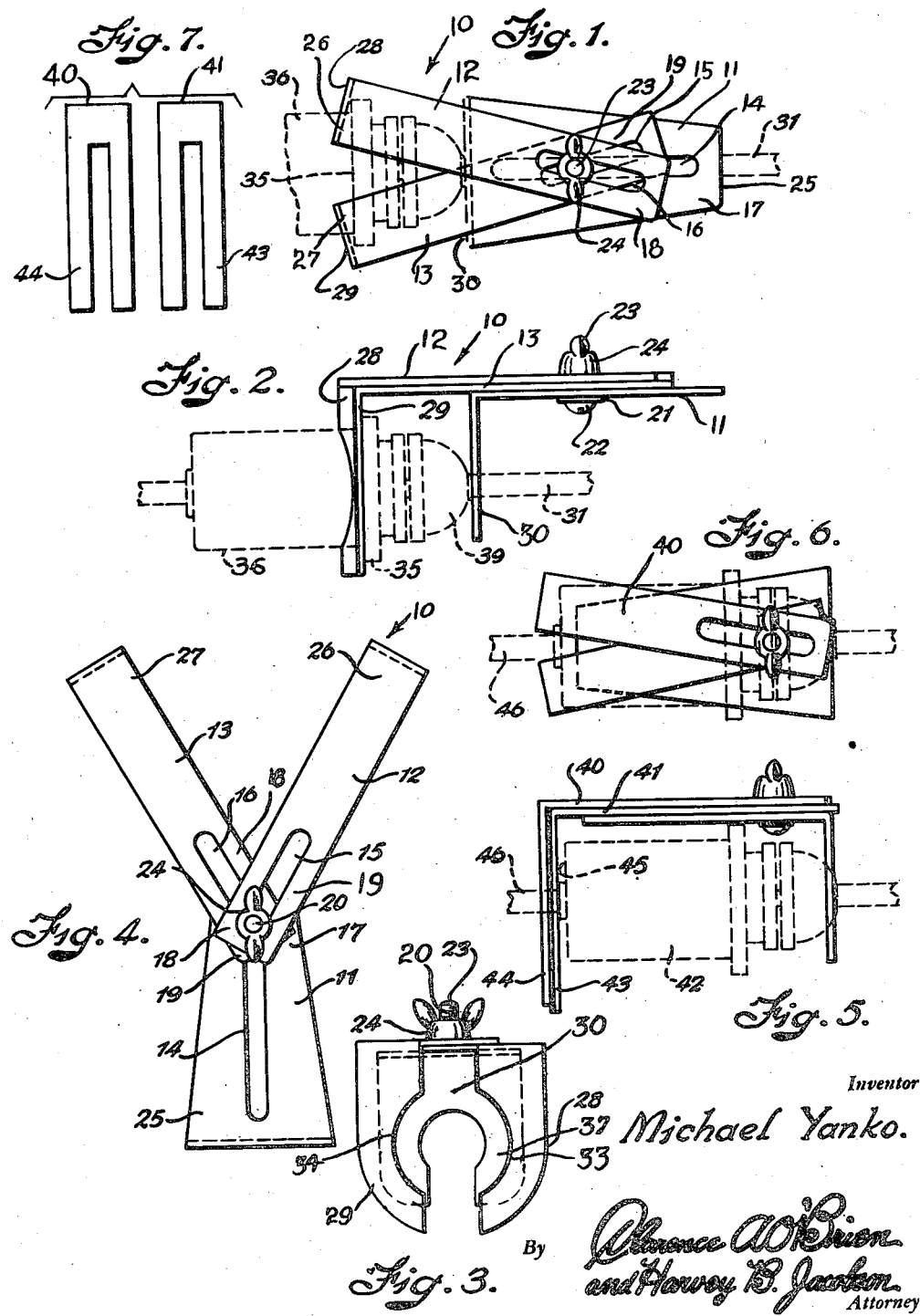
Inventor
Michael Yanko.
By Clarence A. O'Brien
and Harvey B. Jackson.
Attorneys Patented June 14, 1949

2,473,321

UNITED STATES PATENT OFFICE 2,473,321

PLUG-IN CLIP

Michael Yanko, Masury, Ohio

Application July 27, 1945, Serial No. 607,345

4 Claims. (Cl. 173—328)

This invention has reference to electrical wiring connections and has for its object to provide a clip for securing an extension cord plug to a socket so that the plug cannot be accidentally disconnected from the socket.

Another object of my invention is to provide a clip which may be quickly attached or detached from a plug-in connection.

A further purpose of the invention is to provide a clip for securing a plug to a socket and means for locking the same in said secured position.

Other features and advantages will become more readily apparent from the following description and the accompanying illustrative drawings in which:

Figure 1 is a top plan view of my clip shown in operative position,

Figure 2 is a side elevational view,

Figure 3 is an end elevational view thereof,

Figure 4 is a top plan view of the device, the members thereof being spread apart, Figure 5 is a side elevational view of a modification, Figure 6 is a plan view of Figure 5, and Figure 7 is a structural perspective view of the lateral arms of the device.

In the accompanying drawings 10 indicates my clip which consists of three flat metal members 11, 12 and 13, each having aligning slots 14, 15 and 16, respectively, adjacent the ends 17, 18 and 19. The members 12 and 13 define one section and the numeral 11 defines another section, one of said sections being adapted to engage the plug and the other section the socket, as will be later described. Projecting through all three of said slots is a bolt 20, provided with a washer 21 on its head end 22, which washer is of greater width than aforesaid slots. On the free end 23 of the bolt is a wing nut 24.

The members 11, 12 and 13, each terminate at their ends 25, 26 and 27 in right angular clamping arms or flanged extensions 28, 29 and 30, respectively. The arm or annular clamping extension 30, is bifurcated so as to straddle the extension cord 31 to which the plug 32 is attached and the clamping flanges 28 and 29 are formed arcuate on the edges 33 and 34 to seat around the opposite sides of the flange 35 of the socket 36. From the foregoing description it will be seen that the section defined by the members 12 and 13, may straddle the socket members with their clamping flanges 28 and 29 seated behind the flange 35 of the socket. The flange or clamping extension 30 will receive the cord 31, between its tines 37 and 38 when it is moved in against the head 39 of the plug 32. When the flanges 28, 29 and 30, are moved into clamping engagement with the socket and plug, the wing nut 24 is screwed down tight upon 12, whereby all three members 11, 12 and 13, will be secured in fixed position and the plug 32 secured in socket 36.

In Figures 5 and 6, I show a modification of the clip and in which the members or sections 40 and 41 are of a length to extend behind the body of the socket member 42. Angular clamping extensions or lateral clamping flanges 43 and 44 are provided and are preferably of a width to fully engage the rear wall 45 of socket 42, with the exception of the small portion of the wall aligning with the cord 46. Otherwise, the form of the clip is exactly like the one shown in other views of the drawings and above described.

It is thought that persons skilled in the art to which the invention relates will be able to obtain a clear understanding of the invention after considering the description in connection with the drawings. Therefore, a more lengthy description is regarded as unnecessary.

Having now described my invention that which I claim as new and desire to procure by Letters Patent is:

1. A clamp for use in detachably interlocking an electrical socket and a cooperating plug having conducting lines comprising, a first section including a lateral bifurcated clamping arm, a second section extensibly connected thereto, including a pair of complementary members having coactive clamping arms, said arms being adjustable longitudinally relative to said arm and laterally adjustable relative to each other for selective engagement of the plug and the conducting lines, and means for securing said sections in selected positions.

2. A clamp for use in detachably interlocking an electrical socket and a cooperating plug having conducting lines comprising, a first section including a lateral bifurcated clamping arm, a second section extensibly connected thereto including coactive clamping arms, said arms being laterally adjustable for selective engagement of the plug and the conducting lines, complementary guideways in said sections, a pivot element in said guideways and a locking member on said pivot element for securing said sections in selected positions.

3. A clamp for use in detachably interlocking an electrical socket and a cooperating plug having electrical conductors comprising a first member having a lateral clamping arm, a pair of complementary members extensibly connected to said first member, coactive lateral clamping arms on said members, complementary slots in said members and an elongated registerable slot in said first member, a pivot element disposed in said slot in the first member and the slots in the other members, means carried by said pivot element for securing the first member and members in various interrelated positions.

4. A clamp for use in detachably interlocking an electrical socket and a cooperating plug having electrical conductors comprising a first member having a pair of arcuate lateral branches at one end, an elongated slot in said member, a second member and a third member, said second and third members having elongated slots adjacent one of their ends and lateral clamping arms disposed at their other ends, a pivot element disposed in said slots in the members and means for securing the members in various interrelated positions.

MICHAEL YANKO.

REFERENCES CITED

The following references are of record in the file of this patent:

UNITED STATES PATENTS

| Number | Name | Date |
|---|---|---|
| 1,572,988 | Campbell | Feb. 16, 1926 |
| 1,989,823 | Raabe | Feb. 5, 1935 |
| 2,266,560 | Mansfield | Dec. 16, 1941 |